C. CABANA.
SHOCK ABSORBER FOR VEHICLES.
APPLICATION FILED JAN. 17, 1910.
1,029,664.
Patented June 18, 1912.
2 SHEETS—SHEET 1.
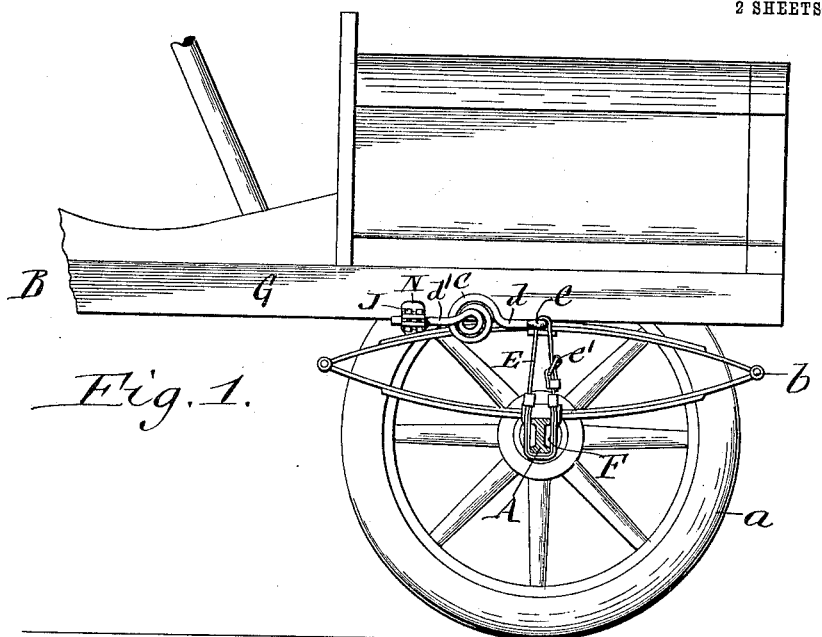
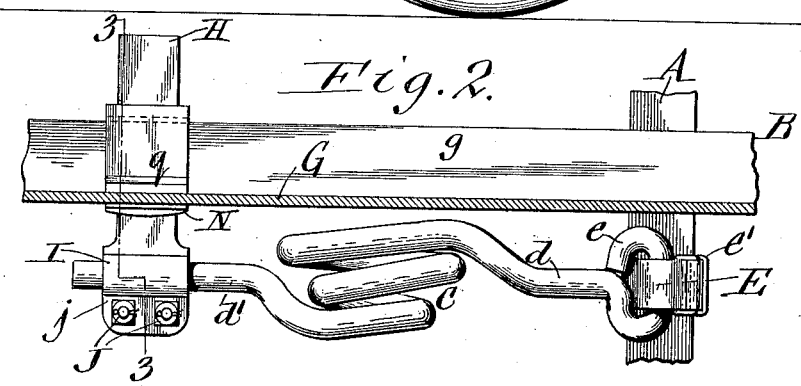
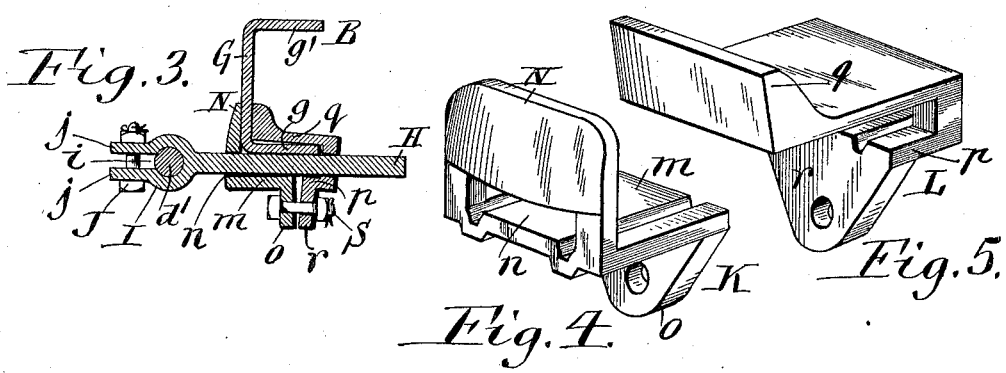
Witnesses:
Richard Sommer
John H. Shoemaker
Inventor
Charles Cabana
by Geyer & Popp
Attorneys.

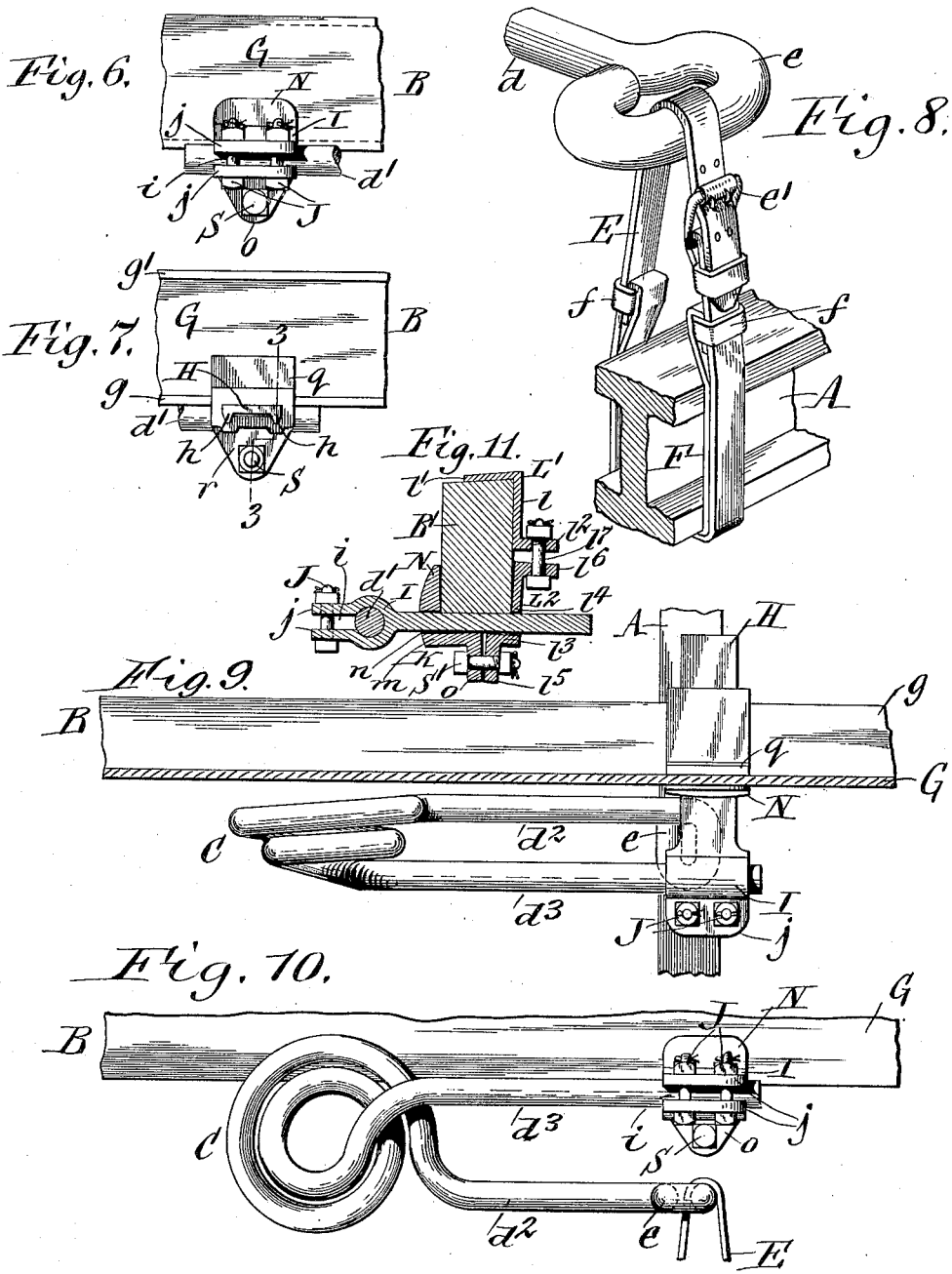

UNITED STATES PATENT OFFICE.

CHARLES CABANA, OF BUFFALO, NEW YORK, ASSIGNOR TO BUFFALO SPECIALTY COMPANY, OF BUFFALO, NEW YORK, A CORPORATION OF NEW YORK.

SHOCK-ABSORBER FOR VEHICLES.

1,029,664.     Specification of Letters Patent.     Patented June 18, 1912.

Application filed January 17, 1910. Serial No. 538,378.

*To all whom it may concern:*

Be it known that I, CHARLES CABANA, a citizen of the United States, residing at Buffalo, in the county of Erie and State of New York, have invented new and useful Improvements in Shock-Absorbers for Vehicles, of which the following is a specification.

This invention relates to a shock absorber for automobiles and other vehicles for preventing undue rebounding of the body from the running gear when the wheels pass over an abnormal obstruction or hole in the roadway.

One of the objects of this invention is to provide an absorber of this character in which the resistance presented to the rebound of the body increases at a progressively greater ratio in proportion to the increase of the rebound and thereby offers only a slight resistance to the movement of the body when the same separates from the running gear a moderate extent but offers a considerably greater resistance when the same separates approximately the maximum distance from the running gear.

Another object of this invention is to provide simple and efficient means whereby the shock absorber may be readily and conveniently attached to automobiles which differ in construction, thereby avoiding the necessity of varying the attaching means to suit different automobiles and permitting of standardizing the construction and reducing the cost accordingly.

This invention has the further object to improve the shock absorber in various details of construction which will be enumerated more fully hereafter.

In the accompanying drawings consisting of 2 sheets: Figure 1 is a fragmentary side elevation of an automobile equipped with one form of my improved shock absorber. Fig. 2 is a sectional top plan view of the absorber and adjacent parts of the vehicle body and running gear, on an enlarged scale. Fig. 3 is a vertical cross section in line 3—3, Fig. 2. Figs. 4 and 5 are perspective views of the two clips of the means for adjustably connecting the spring to the vehicle body. Fig. 6 is an outside elevation of the means for attaching the spring to the body. Fig. 7 is an inside elevation of the same. Fig. 8 is a fragmentary sectional perspective view showing the loose connection between the spring and the axle of the running gear. Fig. 9 is a sectional top plan view showing a modified form of my improved shock absorber. Fig. 10 is a side elevation of the same. Fig. 11 is a vertical transverse section showing my improved shock absorber applied to a vehicle frame or running gear having wooden side bars.

Similar letters of reference indicate corresponding parts throughout the several views.

Referring to Figs. 1–8, A represents the front axle of the running gear of the automobile which is supported by a wheel $a$ at each end, and B is one of the side bars of the body of the vehicle which may be yieldingly connected with the axle by a main elliptical spring $b$. C represents the spring of the shock absorber which is preferably of the spiral type and has its coils or convolutions constructed of progressively smaller diameter from one end of the spring to the other forming a conical volute spring. At its ends the absorber spring is provided with laterally projecting arms $d$, $d^1$ one of which is connected with the axle of the running gear and the other with the bar of the body. The absorber spring is so constructed that when the body and axle separate this spring will be strained but when the body and axle approach one another the spring relaxes. Owing to the conical volute form of the absorber spring its coil or convolution of largest diameter is strained first by the arm connected therewith during the initial part of the separating movement of the body and axle inasmuch as the leverage of this arm on the spring is greater than the leverage of the other arm on the coil or convolution of smallest diameter, thereby causing the spring to offer but a moderate resistance to a slight separation or rebound of the body relatively to the axle and causing the automobile to ride soft and easy at such times instead of stiff and hard as would be the case if the rebound of the body at this time met with a powerful resistance. When, however, the rebound of the body exceeds the normal the increased pull on the absorbing spring causes the stress to gradually extend over a larger part of the coils of gradually decreasing diameter, whereby the resistance which the same offer to the rebound of the body increases at a proportionately greater ratio owing to the reduced leverage and corresponding greater stiffness of the spring coils of smaller diameter, thereby causing the absorber at this time to exert a proportionately greater resistance to off-set the rebound of the body as it approaches nearer to the extreme extent of such movement. It will therefore be apparent that by this conical volute form of absorbing spring a graduated resistance is offered to the rebound of the body which varies to suit the extent of the rebound, this resistance being comparatively mild and practically imperceptible when the automobile is running over a comparatively even road and no unusual deviation of the position of the body relatively to the running gear occurs but when a marked separation of the body and running gear arises, due to running over an abnormally uneven road, that part of the absorbing spring which offers a proportionately greater resistance is called into action and thereby prevents undue rebound of the body at this time. The arms of the spring are preferably arranged lengthwise in line with each other midway of the ends of the spring this being preferably effected by bending or off-setting the arm $d$ of the largest coil toward the smallest coil and similarly bending or off-setting the arm $d^1$ of the smallest coil toward the largest coil, as shown in Fig. 2. By this means the spring and its arms present not only a neat and symmetrical appearance but tipping of the spring out of its upright position under the torsional strains to which it is subjected is also avoided.

It is immaterial which arm of the absorbing spring is connected with the running gear and which to the body. In the construction shown in Figs. 1, 2 and 8 the arm $d$ at the large end of the conical spring is connected loosely or flexibly with the axle by means of a strap preferably constructed of leather to form a circular band or sling E which passes with its upper part through an eye or loop $e$ on the free end of the spring arm $d$ while its lower part passes around the axle. This sling is preferably made adjustable by connecting its ends by a buckle $e^1$, thereby permitting of adapting the absorber to automobiles in which the distance between the body and the axle varies. Between the inner side of the lower part of the sling and the axle is arranged a wearing or reinforcing strip F which saves the sling from wear and which can be renewed when worn out without necessitating renewal of the entire sling. The wearing strip is detachably connected with the main strap E of the sling by means of loops $f$ arranged on the ends of the strip and receiving the adjacent parts of the main strap E. The other arm $d^1$ of the absorbing spring is connected with the side bar of the body by means of a coupling device which permits of attaching the spring thereto different distances from the axle in a direction lengthwise of the body and also different distances from the body transversely of the latter to suit various makes of automobiles. The side bar of the body is preferably of the usual channel form having a lower horizontal flange $g$, an upper horizontal flange $g^1$, and a vertical web G connecting the outer edges of the upper and lower flanges.

The preferred form of coupling device for connecting the arm $d^1$ of the absorbing spring to the side bar of the vehicle body is constructed as follows:—H represents a horizontal bracket or bar arranged transversely under the lower flange of the body side bar and provided on its underside at its longitudinal edges with stiffening ribs $h$. At its outer end the bracket is provided with a socket or eye I which has its axis arranged lengthwise of the vehicle and receives the spring arm $d^1$. The latter may be slid lengthwise in the socket to the desired position and held in its adjusted position by providing the socket on its outer side with a longitudinal slit $i$ and ears $j, j$ on opposite sides of said slit and connecting the ears by means of one or more clamping bolts J. When the bolts J are loose, the bracket and spring arm $d^1$ may be adjusted relatively to each other and upon tightening these bolts after such adjustment, these parts are firmly held in this position relatively to each other. K, L represent two clips whereby the bracket is detachably and adjustably secured to the side bar of the body. The clip K which in this case is the outer one, comprises a horizontal shank $m$ engaging with the underside of the side bar B, a flat jaw N projecting upwardly from the outer end of the shank and engaging with the outer side of the web G and provided with an opening $n$ which receives the bracket and corresponds in form to the cross section of the latter, and a depending coupling lug $o$ arranged at the inner end of the shank. The inner clip L comprises a horizontal shank $p$ which bears against the underside of the bracket, a hook-shaped jaw $q$ arranged at the inner end of the shank $p$ and overhanging the lower flange of the body bar and bearing against the inner side of the web G, and a coupling lug $r$ depending from the outer end of the shank $p$. S represents a horizontal coupling or clamping bolt which connects the coupling lugs of the clips. Upon tightening the coupling bolt S the jaws of the clips are drawn against opposite sides of the body bar and the shanks of the same are pressed upwardly against the underside of the bracket so that the latter is in turn pressed against the underside of the lower flange of the body bar, thereby securely connecting these parts with each other and forming a rigid connection between the absorber spring and the body of the vehicle. When the bolt S is loose the bracket may be shifted transversely in the clips and the latter may be shifted lengthwise on the body side bar to suit the construction of the car or other conditions and after such adjustment or tightening of this bolt the bracket is held both against transverse and longitudinal movement relative to this body bar. The attachment of the absorber spring by these means is very simple and convenient and renders it possible to put the shock absorber on the market with a standard form of attachment which is applicable to various makes of automobiles, thereby not only reducing the cost of same but also avoiding the inconvenience attending the attachment of shock absorbers as heretofore constructed.

Instead of extending the attaching arms of the absorber spring in diametrically opposite directions the same, as shown at $d^2$, $d^3$, in Figs. 9 and 10, may be projected laterally from the same side of the spring and connected with the body and running gear of the vehicle in the same manner as the first mentioned construction.

In applying the absorber to a vehicle frame or running gear having wooden side bars $B^1$, as shown in Fig. 11, one of the clips of the clamp, preferably the inner one, is constructed of upper and lower sections $L^1$, $L^2$ which are adapted to engage with the top and bottom of the side bar and are adjustably connected for adapting the same to wooden side bars varying in height. For this purpose the upper clip section $L^1$ comprises a shank $l$ engaging with the inner side of the bar $B^1$, an outwardly projecting bill $l^1$ at the upper end of the shank $l$ engaging with the top of said bar and an inwardly projecting lug $l^2$ arranged at the lower end of the shank $l$. The lower section $L^2$ of the inner clip comprises an angular shank having a horizontal part $l^3$ bearing against the underside of the bar $B^1$ and a vertical part $l^4$ bearing against the inner side of said bar, a lug $l^5$ depending from the outer end of the lower horizontal part $l^3$ and connected by a bolt $S^1$ with the lug $o$ of the outer clip, and an inwardly projecting lug $l^6$ arranged at the upper end of the upper vertical part $l^4$ and connected by a bolt $l^7$ with the lug $l^2$ of the upper clip section $L^1$.

I claim as my invention:

1. The combination with a vehicle having an axle in its running gear and a frame bar which has a lower horizontal flange and a vertical web, of a shock absorber comprising a spring provided with arms at its ends, means for loosely connecting one arm of the spring with the axle, and means for connecting the other arm of the spring with said bar comprising a horizontal transverse bracket to one end of which the last mentioned spring arm is connected while its opposite end is adapted to engage with said horizontal flange of the body bar, two clips each provided at one end with a jaw adapted to bear against one side of said bar web, at its other end with a coupling lug, and between its ends with an opening which receives said bracket, and a clamping bolt which connects said coupling lugs.

2. The combination with a vehicle having an axle in its running gear and a frame bar which has a lower horizontal flange and a vertical web, of a shock absorber comprising a spring provided with arms at its ends, means for loosely connecting one arm of the spring with the axle, and means for connecting the other arm of the spring with said bar comprising a horizontal transverse bracket to one end of which the last mentioned spring arm is connected while its opposite end is adapted to engage with said horizontal flange of the body bar, two clips each of which has a horizontal shank adapted to bear against the side of the bracket opposite to the horizontal flange of the body bar, a jaw at one end of said shank adapted to bear against one side of the vertical web of said bar, and a coupling lug at the other end of said shank, and a clamping bolt for connecting the coupling lugs of both clips.

Witness my hand this 10th day of January, 1910.

CHARLES CABANA.

Witnesses:
THEO. L. POPP,
ANNA HEIGIS.

---

Copies of this patent may be obtained for five cents each, by addressing the "Commissioner of Patents, Washington, D. C."